United States Patent [19]

Nakagawa

[11] 4,262,856
[45] Apr. 21, 1981

[54] TAPE REEL

[75] Inventor: Akira Nakagawa, Tokyo, Japan

[73] Assignee: Nifco Inc., Yokohama, Japan

[21] Appl. No.: 111,629

[22] Filed: Jan. 14, 1980

[30] Foreign Application Priority Data

Jan. 16, 1979 [JP] Japan .................................. 54-2177

[51] Int. Cl.³ ............................................ B65H 75/18
[52] U.S. Cl. .................................................. 242/71.8
[58] Field of Search ................... 242/71.8, 68.5, 68.6, 242/118.4, 118.5, 118.61, 118.7, 55.19 A, 118.31, 55.19 A

[56] References Cited

U.S. PATENT DOCUMENTS

| 2,974,892 | 3/1961 | Geloso | 242/71.8 |
| 3,002,610 | 10/1961 | Granger | 242/71.8 X |
| 3,753,533 | 8/1973 | Lyman | 242/71.8 |
| 3,794,258 | 2/1974 | Posso | 242/71.8 |
| 4,226,381 | 10/1980 | Katata | 242/71.8 |

Primary Examiner—Edward J. McCarthy
Attorney, Agent, or Firm—Thomas W. Buckman; Jack R. Halvorsen

[57] ABSTRACT

A plastic tape reel comprising a hub and two flanges attached one each to the opposite axial ends of the hub, the hub comprising an inner cylindrical part possessing a hollow portion adapted to engage with a reel engaging shaft, an outer cylindrical part possessing a peripheral surface adapted to have tape wound thereon and an annular part extending to connect the inner cylindrical part and the outer cylindrical part. The annular part is bent in the axial direction over its radial length and is constructed so that the inner edge thereof joins the axial basal edge of the inner cylindrical part and the outer edge thereof joins the outer cylindrical part intermediate of the entire axial length thereof.

3 Claims, 3 Drawing Figures

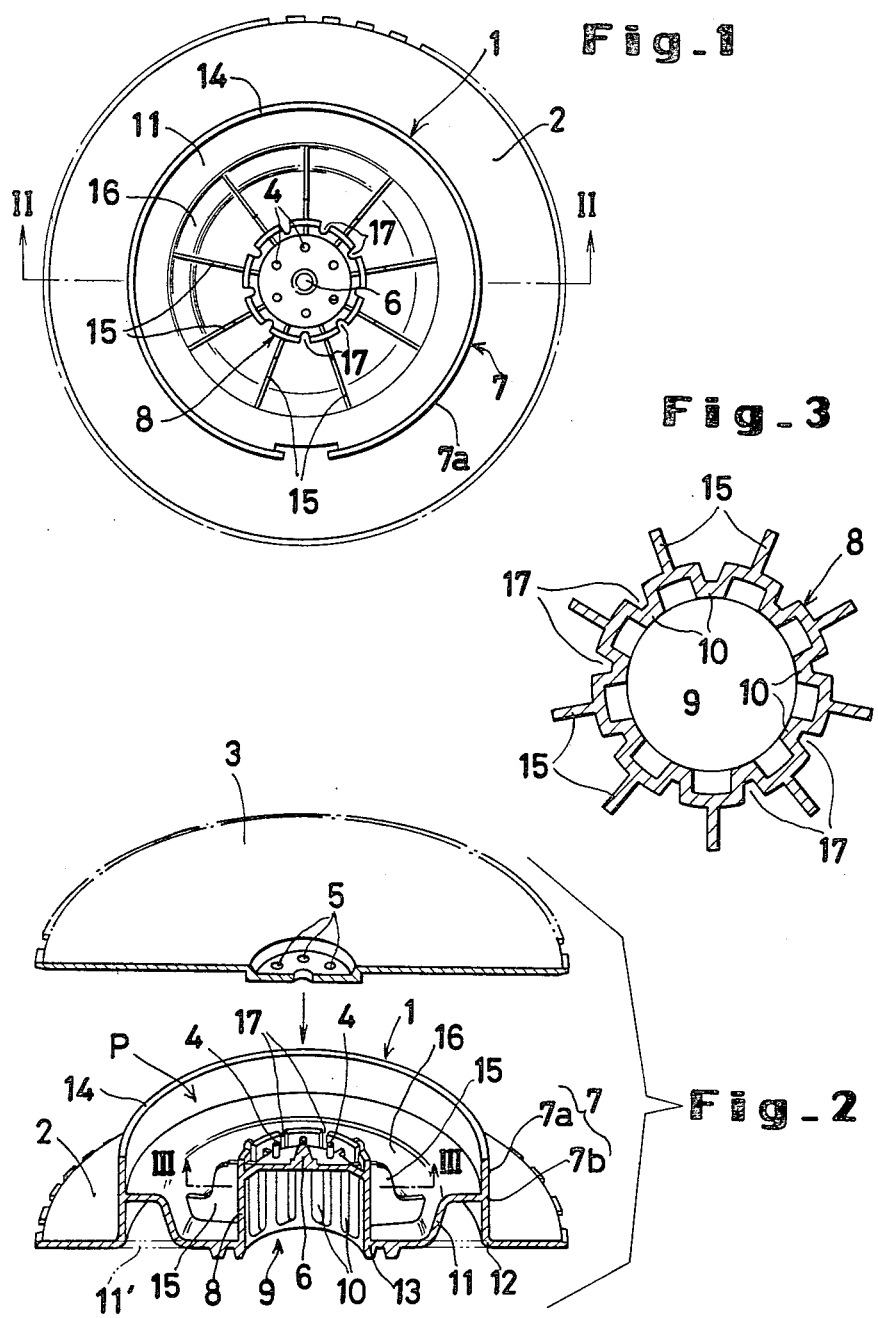

4,262,856

TAPE REEL

BACKGROUND OF THE INVENTION

This invention relates to a tape reel, particularly to a plastic tape reel which is most suitable for use in video cassettes.

Recently, the demand for video cassette tapes has been rapidly accelerating as a result of the increasing popularity of video recording and reproducing devices. For ease in molding, tape reels widely used for tapes of this type are made exclusively of plastic material. Nevertheless, these tape reels are required to satisfy an extremely rigid fabricative tolerance.

Plastic tape reels having fairly high dimensional accuracy have found popular acceptance. Since the tape reels of this type are destined inevitably by nature to undergo the steps of thermal molding and curing, they tend to sustain sink marks in the process of being cured. Even a slight strain, if allowed to build up in the tape reel, has a strong possibility of producing adverse effects on the quality of images recorded and reproduced with the video devices.

The tape reel of this type generally has a pair of circular flanges axially connected to each other through the medium of an intervening hub. The hub has an outer cylindrical part and an inner cylindrical part disposed concentrically relative to each other, the outer cylindrical part serving as the core upon which the tape is to be wound and the inner cylindrical part permitting the reel engaging shaft of the video device to come into engagement with the interior thereof. Actually for the convenience of fabrication, one of the pair of flanges is integrally molded in advance at one end of the hub and the remaining flange is molded separately. The latter flange is then fastened to the free end of the hub by either ultrasonic welding or snapping engagement.

In the conventional tape reel, the portion for connecting the inner cylindrical part and the outer cylindrical part of the hub to each other in the radial direction has been generally formed by an annular part integrally formed with the flange to be flush therewith. From the standpoint of the flow of molten resin, molding of the integrally formed hub-and-flange inevitably involves two separate paths for the molten resin, the one path extending from the outer edge of the annular part toward the free edge of the outer cylindrical part and the other from the outer edge of the annular part radially toward the circumferential edge of the flange. Thus, a sink mark tends to occur along the line of separation of the paths while the molded resin is being cured. Further, while the outer cylindrical part is being cured, although the basal portion of the outer cylindrical part directly supported by the annular part is allowed to shrink uniformly, the open edge portion of the outer cylindrical part which is intended for eventual engagement with the independently molded flange tends to warp ununiformly inwardly in the radial direction and impair the uniformity of the outside diameter of the outer periphery of the hub on which the tape is to be wound. Such uniformity of outside diameter may lead to such undesirable phenomena as uneven rotation of the hub and uneven winding of the tape and consequently make it necessary to reject the final product.

An object of this invention is to provide a tape reel of a construction such that it can be molded with high dimensional accuracy and ample strength and which is free from the strain resulting from the molding.

SUMMARY OF THE INVENTION

To accomplish the object described above according to this invention, there is provided a tape reel wherein the annular part serving to connect the inner cylindrical part and the outer cylindrical part of the hub in the integrally molded hub-and-flange is bent in the axial direction so that the inner edge thereof joins the axially basal edge of the inner cylindrical part and the outer edge thereof joins the outer cylindrical part at a point intermediate of the entire axial length thereof. The tape reel of this construction, therefore, has no portion where the outer cylindrical part and the flange portion meet each other in the hub-and-flange in such a way as to suffer the occurrence of a sink mark in the course of the molding. This invention, therefore, affords a plastic tape reel which enjoys freedom from dimensional inaccuracy. Further because the annular part joins the outer cylindrical part at a level intermediate of the entire axial length thereof, the tape reel of this invention has practically no possibility of impairing the uniformity with which the tape is wound on the outer cylindrical part of the hub.

The other objects and characteristics of the present invention will become apparent from the further disclosure of the invention to be given herein below with reference to the accompanying drawing.

BRIEF EXPLANATION OF THE DRAWING

FIG. 1 is a plan view of one embodiment of the tape reel according to this invention, wherein the independently molded flange is omitted to show the condition in which the other flange is molded integrally with the hub.

FIG. 2 is a perspective view of the tape reel of FIG. 1 including a section taken along the line II—II of FIG. 1.

FIG. 3 is a sectioned view of the tape reel taken along the line III—III of FIG. 2.

DESCRIPTION OF THE PREFERRED EMBODIMENT

The tape reel of the present invention will be described with reference to the illustrated embodiment.

Fast attachment of an independently molded flange 3 to the open end of a hub 1 can be accomplished by any of the known methods resorting such as to snapping engagement, helical insertion or welding. In the illustrated embodiment, this attachment is obtained by allowing a plurality of projections 4 raised axially from the central portion of the open end of the hub to be passed through matched perforations 5 formed at the corresponding locations in the flange 3 and crushing the tips of the projections still protruding from the perforations 5 by means of ultrasonic welding and fusing the crushed tips of the projections with the flange 3.

Since the illustrated embodiment represents a tape reel which is intended for use in video cassettes, the hub is provided at the center thereof with projections 6 which extend through the center of the flange 3 attached to the hub and come into contact with a resilient piece (not shown) fastened to the interior of the video cassette.

The hub 1 is formed of an outer cylindrical part 7 possessing a cylindrical outer surface 7a on which a tape (not shown) is wound and an inner cylindrical part 8 disposed concentrically relative to the outer cylindrical part and provided on the upper surface thereof with the aforementioned projections 6. Internally, the inner cylindrical part 8 contains a hollow portion 9 which extends in the axial direction from the integrally molded flange 2 side. The hollow portion 9 is provided on the inner wall surface thereof with ribs 10 protruding toward the axis of the cylinder and suitably spaced in the circumferential direction.

As is well known, this hollow portion 9 is adapted to admit into intimate engagement with the engaging portion of the reel shaft formed on the recording and reproducing device. In tape reels other than that illustrated herein, the inner cylindrical part is generally provided with an engaging hollow portion 9 or a similar engaging means 10 to permit fast engagement of the tape reel with the reel shaft of the recording or reproducing device.

The flange portion of an integrally molded flange 2 extends in the radial direction from one of the axial edges of the outer cylindrical part 7 of the hub.

With respect to the construction of the tape reel described above, the present invention is characterized in particular by the structure of an annular part 11 serving to connect the outer cylindrical part 7 and the inner cylindrical part 8 to each other in the hub 1. As already touched upon, in the conventional tape reel, the annular part has the shape of a ring which simply serves the purpose of connecting the axial edges 13, 12 of the inner and outer cylindrical parts 8, 7 in a horizontal plane. (In FIG. 2, the annular part of the conventional reel is shown in broken lines and is denoted by numeral 11'.) By the ordinary method of molding wherein the molten resin is introduced through the free end of the inner cylindrical part 8, a sink mark is apt to occur along the axial edge 12 at which the annular part meets the outer cylindrical part 7 and the flange 2, with the result that the dimensional accuracy of the flange 2 and that of the outer cylindrical part 7 are impaired. There is also a possibility that the other edge 14 of the outer cylindrical part will be warped inwardly as indicated by the arrow "P" and consequently deformed while the tape reel is being cured after the step of molding. Thus, the outer cylindrical part in the conventional tape reel has failed to exhibit sufficient strength.

In the present invention, therefore, the annular part extending in the radial direction is formed so that the inner edge thereof, though continuing into the axial edge 13 of the inner cylindrical part 8, is bent upwardly in the axial direction at the circular line falling half-way of the entire radial length of the annular part and the outer edge thereof is connected to a portion 7b of the outer cylindrical part 7 intermediate of the entire axial length thereof.

When the annular part 11 is formed as described above, the flow of molten resin upon reaching this joining portion 7b separates along two paths and advances toward the two axial edges 12, 14 of the outer cylindrical part. Consequently, the provision of the annular part 11 means that the molten resin flows in both directions in the outer cylindrical part from the portion 7b so that shrinkage on curing is equalized and, moreover, the possible inward warping of the axial edges 12, 14 of the outer cylindrical part can be prevented by the supporting action of the annular part 11. Further, the basal edge 12 of the outer cylindrical part through which the path for the molten resin continues into the flange 2 has no branched path and permits the molten resin to be uniformly injected. Thus, no sink mark is produced on the flange surface. The finished product, therefore, enjoys high dimensional accuracy and retains its commercial value.

In the illustrated embodiment, the outer edge in the radial direction of the annular part 11 joins the outer cylindrical part 7 at a level halfway of the entire axial length thereof. For the convenience of design, the position at which the edge joins the cylindrical part may suitably be varied in the axial direction. It is undesirable, however, for this position to be moved up as far as the open edge 14 of the outer cylindrical part 7. This is because the basal edge 12 which continues into the flange 2 would tend to be warped inwardly should the aforementioned position be raised to the open edge 14.

Also in the tape reel of this invention, reinforcing crosspieces 15 may be disposed radially as suitably spaced in the circumferential direction in addition to the reinforcement provided by the annular part 11 described above. Since the annular part 11 rises in the axial direction, it contains an inwardly facing wall surface 16 as illustrated in FIG. 2. When the reinforcing crosspieces are disposed, although the inner edges of these crosspieces may be extended substantially over the entire axial length of the outer surface of the inner cylindrical part, the outer edges thereof may be given a decreased height and allowed to join the wall surface 16 of the annular part 11 instead of the outer cylindrical part 7. Thus, the crosspieces are only required to aid the annular part 11 in fulfilling its function of supporting the outer cylindrical part. Moreover, the reinforcing crosspieces thus constructed prove rather advantageous than otherwise, because the flow of molten resin is effected more smoothly and the number of points of contact made on the outer cylindrical part is smaller. Consequently, the possibility that such undesirable phenomena as sink marks will occur on the outer cylindrical part which is expected to enjoy high dimensional accuracy is remote.

When the component parts of the tape reel are, as much as possible, formed in a uniform wall thickness, the flow of molten resin is smoothened and the curing time is uniformized at all points of the tape reel. Since the rear sides of the shaft-engaging ribs 10 have a large wall thickness, therefore, it is desirable to insert notches 17 one each in the rear sides as illustrated in FIG. 3. In outward appearance, these notches are depicted as dividing, in the form of petals, the outer periphery of the inner cylindrcial part 8 of the hub as illustrated in FIGS. 1 and 2.

The gate for the injection of the molten resin in the course of molding is desired to be formed in the tip of any of the plurality of projections 4 formed for the attachment of the independently molded flange 3 or in the small recess formed at the leading end of the central projection 6. The former case proves particularly desirable because the scar of the gate is crushed in conjunction with the tip of the projection at the time of the attachment of the independently molded flange and, consequently, the finished tape reel retains no scar of the gate. Even in the latter case, the prominence of the scar of this gate can be prevented.

By the present invention, those component parts of the tape reel which, from the standpoints of dimensional accuracy and commercial value, are not tolerated to sustain any form of strain due to plastic molding can be advantageously molded as desired. The tape reel thus produced, therefore, enjoys ample strength.

What is claimed is:

1. In a plastic tape reel comprising a hub and two flanges attached one each to the opposite axial ends of the hub, said hub comprising an inner cylindrical part possessing a hollow portion adapted to engage with the reel engaging shaft of a video recording and reproducing device, an outer cylindrical part possessing a peripheral surface adapted to have tape wound thereon and an annular part connecting said inner cylindrical part to said outer cylindrical part wherein at least one of said two flanges is molded integrally with one axial end of said hub, the improvement which comprises the annular part being bent in the axial direction over its radial length and being constructed, so that the inner edge thereof joins the axial basal edge of said inner cylindrical part and the outer edge thereof joins said outer cylindrical part intermediate of the entire axial length thereof.

2. The tape reel according to claim 1, wherein the outer edge of the annular part joins the outer cylindrical part at a height equalling about one half of the entire axial length of the outer cylindrical part.

3. The tape reel according to claim 1, which further comprises a plurality of radially spaced reinforcing crosspieces disposed between the outer surface of the inner cylindrical part and the bent portion of the annular part.

* * * * *